US005790949A

United States Patent [19]
Tognazzini

[11] Patent Number: 5,790,949
[45] Date of Patent: Aug. 4, 1998

[54] PAGING DEVICE WITH ABILITY TO AUTOMATICALLY CONNECT BY TELEPHONE A PERSON INITIATING A PAGE REQUEST TO THE PERSON PAGED

[75] Inventor: Bruce Tognazzini, Woodside, Calif.

[73] Assignee: Sun Microsystems, Inc., Palo Alto, Calif.

[21] Appl. No.: 671,292

[22] Filed: Jul. 1, 1996

[51] Int. Cl.⁶ ................................................. H04M 11/00
[52] U.S. Cl. ....................... 455/426; 455/31.2; 455/458
[58] Field of Search .................. 379/57, 56; 340/825.44, 340/311.1; 455/38.1, 31.2, 556, 151.2, 426, 458

[56] References Cited

U.S. PATENT DOCUMENTS

| | | | |
|---|---|---|---|
| 4,713,808 | 12/1987 | Gaskill | 370/94 |
| 5,054,051 | 10/1991 | Hoff | 455/556 |
| 5,428,663 | 6/1995 | Grimes et al. | 455/31.2 |
| 5,473,667 | 12/1995 | Neustein | 455/31.2 |
| 5,585,953 | 12/1996 | Zavrel | 455/151.2 |

FOREIGN PATENT DOCUMENTS

503813   9/1992   European Pat. Off. .

Primary Examiner—Dwayne D. Bost
Assistant Examiner—Myron K. Wyche
Attorney, Agent, or Firm—McDermott, Will & Emery

[57] ABSTRACT

A paging system communicatively connects a first user initiating a page request using a first telephone to a second user receiving the page request using a second telephone. The paging system includes a paging service transmitter transmitting the page request, and a paging device. The paging device includes a page receiver receiving the page request as a first signal, and a first identification device. The first identification device receives the first signal indicating that the page request was received, and includes an identification transmitter for transmitting a second signal indicating that the second user is ready to be communicatively connected. The paging system includes a second identification device, and receives the second signal transmitted by said first identification device. The second identification device transmits a third signal including a destination number corresponding and addressable to the second telephone. The paging system further includes a page locator device receiving notification of the page request from the first user and receiving the third signal. The page locator device communicatively connects the first user to the second user receiving the page request using the second telephone responsive to the destination number received in the third signal.

23 Claims, 9 Drawing Sheets

PAGING DEVICE WITH ABILITY TO AUTOMATICALLY CONNECT BY TELEPHONE A PERSON INITIATING A PAGE REQUEST TO THE PERSON PAGED

BACKGROUND OF THE INVENTION

1. Field of the Invention

The present invention generally relates to pagers or features for paging devices, and more particularly to a paging device with the ability to automatically connect telephonically a person initiating the page request to the person receiving the page request.

2. Background of the Related Art

Paging devices exist today that generally provide a very limited amount of information regarding the page request that is received by the paging device. For example, many doctors utilize paging devices so that they may be notified when a patient requires personal attention/review with respect to the patient's current health status. In these situations, the doctor is paged, or what has been coined "beeped". The doctor then either knows to telephone the hospital if no additional information is provided from the pager besides the beep sound, or is able to determine the specific person that initiated the page request by viewing a display on the pager which provides the telephone number of the page initiator. Thus, in this situation, the doctor must find a telephone and actually dial the party initiating the page request.

Problems

The paging device is highly used in today's environment due to its portability, compact size, ease of use as well as its wide working range or signal reception range. However, because of the paging device's limited amount of information that it is able to receive in a page request, paging devices are generally not used for standard everyday communications. Rather, paging devices are generally used when the page initiator is attempting to contact the page receiver for an emergency or extremely urgent situation.

Other standard alternatives to paging devices have also proved to be unsatisfactory for notifying an individual that a telephone call is incoming or present to be connected between the page initiator and the page receiver. For example, cellular telephones provide a very limited operating range while at the same time being bulky in comparison to the paging device. In addition, cellular telephones require batteries having a very limited working duration before requiring recharge. Thus, the cellular user is constantly worrying whether the cellular batteries are low, and whether the cellular telephone should be turned off to conserve battery power. Therefore, the cellular telephone lacks the relatively carefree operation as the paging device that has batteries which can last for many months. Of course, requiring the person being paged to locate a fixed telephone and dial the person initiating the page request may be very inconvenient for the person being paged.

It would be desirable to have a paging device that is compact, portable and provides the convenience for the person being paged to be telephonically connected to the person initiating the page request. It would also be desirable to provide a paging device that automatically telephonically connects the individual receiving the page request to the person initiating the page request having a long battery life that does not require significant maintenance or attention by the user. That is, in accordance with the invention, it is desirable to provide a paging device where the user need not worry or expend time and/or energy in recharging the batteries.

It would be desirable to provide a paging device that enables the user of the device to be more conveniently telephonically connected to the page initiator. In addition, it would be desirable to provide a paging device that enables automatic telephonic connection between the page initiator and the page receiver.

SUMMARY OF THE INVENTION

In one form, the present invention is implemented in a compact, portable and convenient paging device with the ability to coordinate the telephonic connection between the page initiator and the page receiver.

In another form, the invention is implemented in a paging device with long battery or power supply life so that the individual receiving the page request need not worry nor be concerned with whether the paging device should be deactivated to conserve battery or power supply life.

A paging device in accordance with the invention facilitates the automatic telephonic connection between the page initiator and the page receiver by reducing the number of operations required therefore.

A paging device is provided with the ability to automatically connect the person initiating the page request to the person receiving the page request without requiring the page receiver to manually dial the telephone number of the page initiator.

In accordance with the invention, a paging device is provided that is able to automatically telephonically connect the page initiator with the page receiver. The paging device is compact and portable. In addition, the paging device is designed to utilize small amounts of power, and therefore, is able to operate for a long duration under battery power. The paging device includes, or is disposed in, a standard wristwatch pager having a low frequency radio transmitter or infrared transmitter. The paging device is similar to the general paging processes used in existing standard pager technology, with the exception that the paging device includes additional features in support thereof. For example, when a page request has been initiated by a page initiator, the paging device will receive the page request and notify the user regarding the existence of the page request. The user of the paging device then picks up the nearest available telephone or takes the nearest available telephone off hook. Once the user has taken the nearest available telephone off hook, the page initiator is telephonically connected to the page receiver via the paging service.

The paging device has various designs or embodiments, depending on whether the paging device is being used within a relatively confined predetermined geographic area (private branch exchange (PBX)), or whether the paging device is being used in a more open or large geographic area, i.e., the "outside world".

When the paging device is used in a confined, small predetermined geographic area, such as within a company PBX, the operation or process of the paging device is as follows. A wristwatch paging device receives notification of the page request from the company telephone paging system, and optionally, the page initiator's name. The paging device then vibrates or generates an audible tone to notify the person receiving the page of the existence of the page request, and optionally displays the page initiator's name on the display of the wristwatch. The page receiver or person receiving the page then picks up or places off hook the nearest telephone, which contains or includes a contact sensor or antenna for receiving a signal generated by the page device.

The compact sensor or receiver is preferentially located within the telephone device, but can also be an add-on accessory to a standard telephone. When the contact sensor/receiver is an accessory to a standard telephone, this accessory will also include sufficient functionality either to direct the standard telephone to transmit a signal to the paging service or include its own functionality to transmit a signal to the paging service. The signal which is being transmitted by the accessory contact sensor/receiver is a signal indicating that the person receiving the page acknowledges receipt of same, and desirous of telephonically connecting with the page initiator using the telephone that is currently being used by the page receiver.

Upon receiving the acknowledgement or signal from the person receiving the page, the user picks up or places off hook the nearest telephone which includes the contact sensor or antenna within the handset. The paging device then communicates with the telephone through, for example, a low power radio frequency using the user's body as a transmission medium or by emitting an infrared signal that is received by a receiver in the handset. The paging device communicates with the telephone in such a manner that the user is identifiable by the telephone system. The paging service then transfers the telephone call from the person initiating the page to the telephone which the user has picked up.

For paging devices that do not include a display for displaying the name of the page initiator, the page initiator's name may be alternatively displayed on the telephone before the paging device connects the page initiator with the page receiver. In accordance with this design, the page receiver is required to press a button or press the switch hook of the telephone to be telephonically connected with the page initiator after the page receiver has agreed to receive the telephone call.

When the paging device is used in a large geographic area, the following processes are utilized to accomplish the function of automatically telephonically connecting a page initiator with the page receiver. The paging device, which is portable and compact so that it may be embedded in a standard wristwatch, receives notification or the page request from the commercial paging service, together with the page initiator's name derivable from the standard caller ID features/functions. In addition, the paging device receives the telephone number of the paging service so that the page receiver automatically connects with the paging service and transmits information thereto.

For even more convenience, the paging device may also contain the page receiver's calling card number or other type of credit card number. Therefore, when the telephone call connection between the page initiator and page receiver is a toll call, the paging device can still automatically telephonically connect the call.

Alternatively, the paging device may also have prestored area telephone numbers for each of the different paging services. In this situation, the paging device receives information as previously discussed, and in addition receives an identifier uniquely identifying the paging service that has transmitted the page request.

The page receiver or person receiving the page request picks up the nearest telephone in response to being notified of the page. If the nearest telephone is equipped for receiving the pager's transmission signal, the telephone will receive the pager's transmission (e.g., infrared transmission or radio frequency transmission) and the page initiator will be automatically telephonically connected with the page receiver. If the telephone that the page receiver picks up is not equipped with the function of being able to receive the page device's transmission, the user of the page device will alternatively hold the pager in front of the telephone and press a button on the paging device or otherwise instruct the paging device to release a sequence of touch tones for connection with the paging service, and ultimately with the page initiator.

In the event that the person receiving the page request does not pick up or place off hook the telephone in time for connection with the page initiator, the paging device will dial back the telephone number of the page initiator as a separate phone call (using the telephone which the page receiver has picked up too late). In the event that the telephonic connection between the page initiator and page requester (e.g., telephone call initiated by the page initiator which the page receiver has picked up in time for a direct connection with the page initiator, or when the page receiver has not picked up the telephone in time and the paging device dials the page initiator back) is a toll or chargeable call, the paging device will issue (or request the user of the paging device or page initiator to issue) the calling card number or credit card number of the appropriate person.

In accordance with a first embodiment, a paging system communicatively connects a first user initiating a page request using a first telephone to a second user receiving the page request using a second telephone. The paging system includes a page transmitter transmitting the page request, and a paging device responsively connected to said page transmitter. The paging device includes a page transmitter broadcasting the page request as a first signal, and a first identification device responsively connected to said page receiver. The first identification device receives the first signal indicating that the page request was received by said page receiver, and includes an identification transmitter for transmitting a second signal indicating that the second user is ready to be communicatively connected to the first user initiating the page request. The paging system includes a second identification device associated with the second telephone, and receives the second signal transmitted by said first identification device. The second identification device transmits a third signal including a destination number corresponding and addressable to the second telephone. The paging system further includes a page locator device receiving notification of the page request from the first user and receiving the third signal transmitted by said second identification device. The page locator device communicatively connects the first user initiating the page request using the first telephone to the second user receiving the page request using the second telephone responsive to the destination number received in the third signal.

According to another design, a method is provided for communicatively connecting a first user initiating a page request using a first telephone to a second user receiving the page request using a second telephone. The method includes the steps of transmitting the page request as a first signal, receiving the first signal indicating that the page request was received, and transmitting a second signal indicating that the second user is ready to be communicatively connected to the first user initiating the page request. The method also includes the steps of receiving the second signal, transmitting a third signal including a destination number corresponding and addressable to the second telephone, and receiving notification of the page request from the first user. The method also includes the steps of receiving the third signal, and communicatively connecting the first user initiating the page request using the first telephone to the second user receiving the page request using the second telephone responsive to the destination number received in the third signal.

These, together with other features and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE PREFERRED EMBODIMENTS

Figure 1:
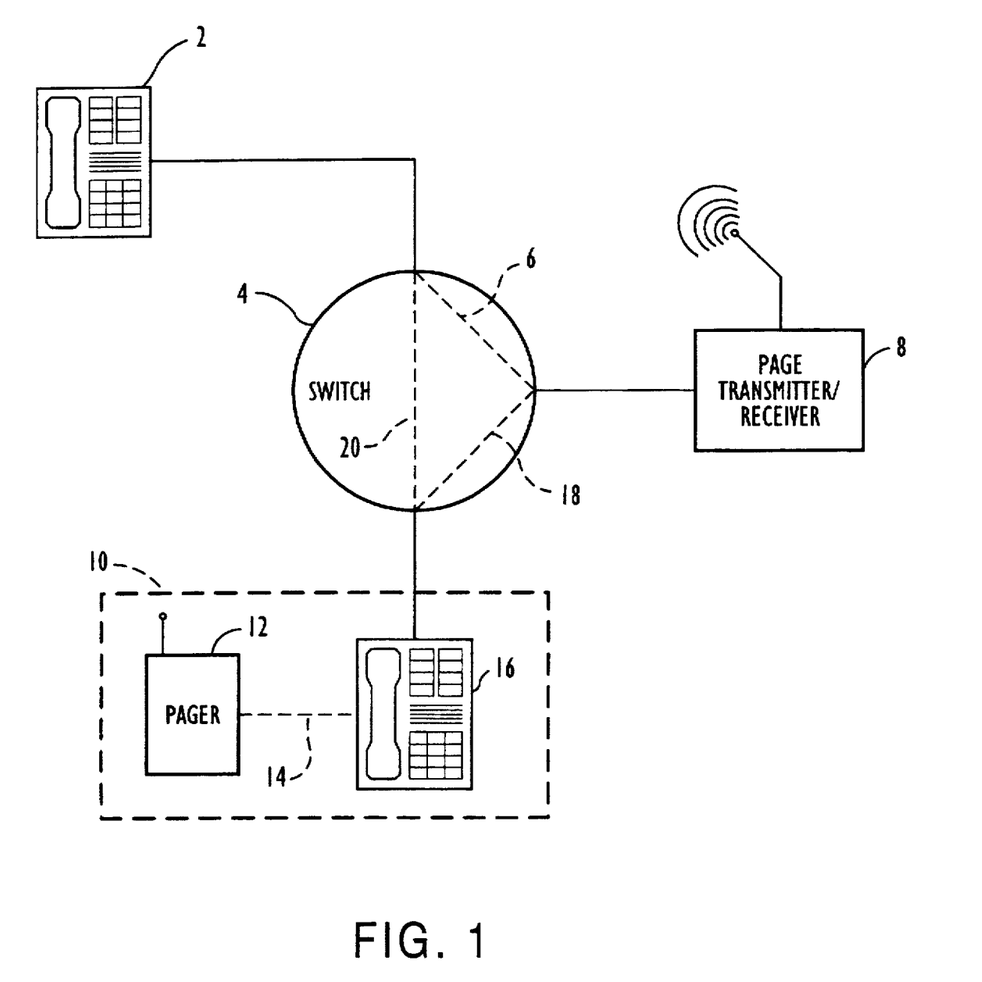
FIG. 1 is a basic block diagram of a network architecture of a paging device having the ability to automatically connect the person initiating the page request with the person receiving the page.

FIG. 1 is a basic block diagram of the network architecture that utilizes the paging device having the ability to automatically connect the person initiating the page request with the person receiving the page request. In FIG. 1, the person initiating the page request picks up the handset of telephone 2 and dials the paging service. The telephone call is connected via standard central office switch 4 to the page transmitter/receiver 8 of the paging service via connection 6. The page transmitter/receiver 8 of the paging service then broadcasts the page using a standard technique for reception of the page request by paging device 10 that is physically located on or near the person receiving the page.

Paging device 10 includes a standard pager 12 that is communicable with telephone 16 selectable by the page receiver to be ultimately connected with the telephone associated with the page initiator. Pager 12 is communicable with telephone 16 via communication medium or means 14, described in detail below. Pager 12 transmits to the transmitter/receiver 8 via communication means 14 and telephone 16 a signal identifying when the person receiving the page request is located in the vicinity of telephone 16 and is able to receive a telephone call from the page initiator. Alternatively, pager 12 may instead of communicating with telephone 16, communicate directly with transmitter/receiver 8 of the paging service.

Upon transmission of the signal identifying the telephone which is in the vicinity of the person to receive the page request via connection 18 in switch 4 to the paging service, the paging service then transfers the page initiator's telephone call from telephone 2 to telephone 16 located in the vicinity of th e person receiving the page via, for example, connection 20. The paging service accomplishes this transfer of the page initiator's telephone call by instructing the standard programmable switch to transfer the call to the person receiving the page. Alternatively, the paging service may simply itself transfer the page initiator's call using standard call transfer and/or call forwarding techniques that will permit the page initiator to be in connection with telephone 16 located near the person that has already received the page request. In this alternative, telephone 2 is telephonically connected to telephone 16 via, for example, connections 6 and 18.

Figure 2:
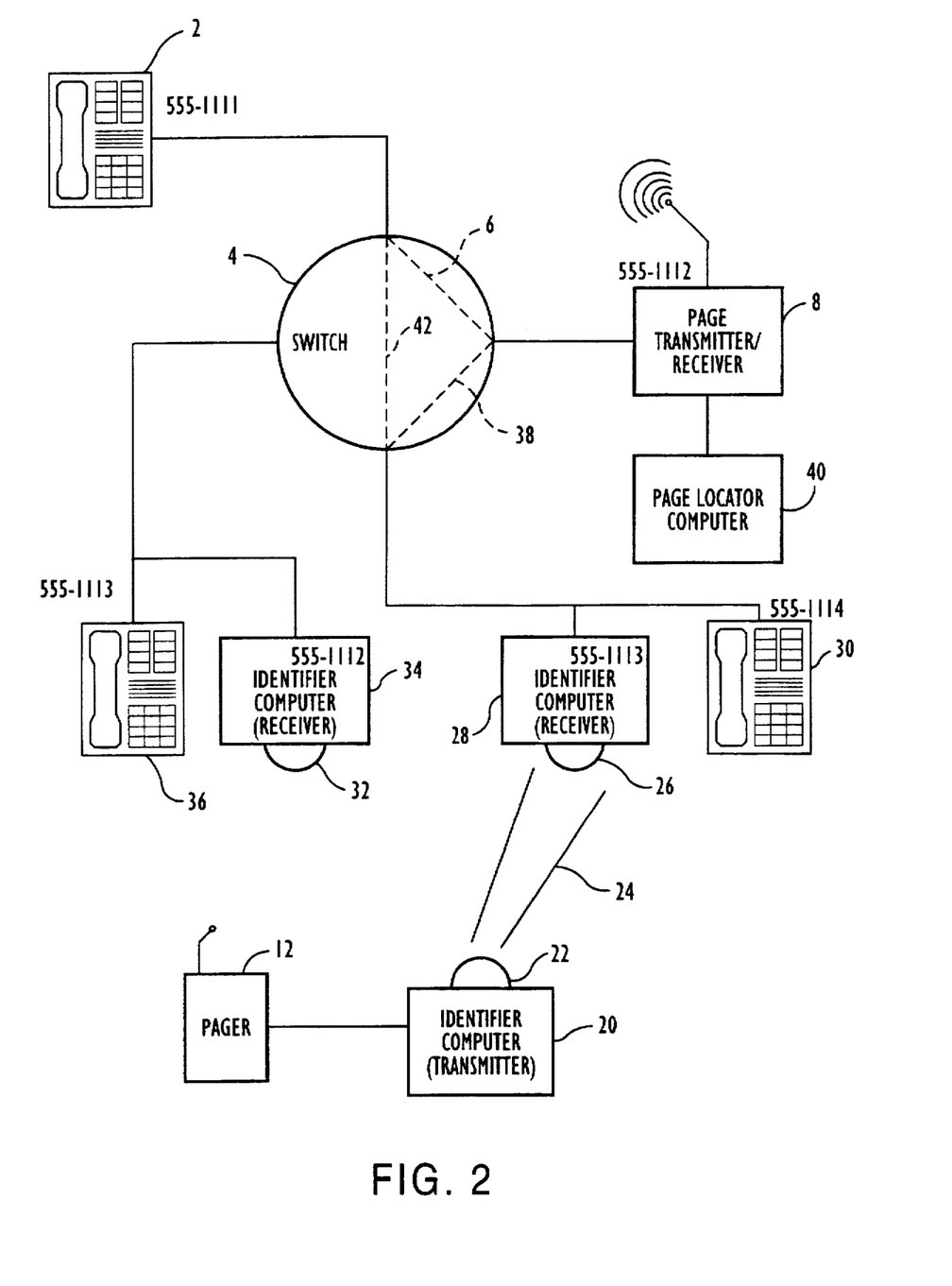
FIG. 2 is a detailed block diagram of the network architecture utilizing the page device having the ability to automatically connect the person initiating the page request with the person receiving the page.

FIG. 2 is a detailed block diagram of the network architecture used in conjunction with the paging device enabling telephonic connection between the person initiating the page request and the person receiving the page request. In FIG. 2, the person initiates the page request at telephone 2 and is connected to the paging service via central office switch 4 and communication link 6. The paging service then transmits the page request via page transmitter/receiver 8. The page request is subsequently received by pager 12. Upon receipt of the page request and notification to the user, the user has the option of requesting that the page initiator be telephonically connected to the telephone that the page receiver has selected and which is geographically within the vicinity of the page receiver.

Upon activation of this function in the paging device, a signal is transmitted from the paging device via page identifier computer 20 and transmission device 22. The signal is then received by page identifier computer 28 via receiver 26 since this is the telephone 30 that is in the vicinity of the person that has received the page request. Note that since telephone 36 is not in the vicinity of the person receiving the page request, page identifier computer 34 and receiver device 32 do not receive the signal generated from page identifier computer 20 and transmitter 22.

Upon reception of the identifier signal from identifier computer 20, identifier computer 28 transmits the signal to page locator computer 40 via switch 4 and connection 38, and optionally page transmitter/receiver 8. Once the page locator computer 40 receives the identifier signal from the paging device, the page locator computer 40 then knows the destination telephone number which the paging device is located near. Thus, page locator computer 40 then either performs a standard call transfer function to transfer the person initiating the page at telephone 2 to the person that is to receive the page at telephone 30 via, for example, connections 6 and 38.

Alternatively, the page locator computer 40 may transmit signals to the switch or directly connect the person initiating the page at telephone 2 with the person that is to receive the page at telephone 30 via connection 42. Switch 4 may be, for example, a standard programmable switch, such as a 5ESS switch. On this basis, the person initiating the page is able to be telephonically connected to the person that is receiving the page without knowing the specific telephone number associated with the telephone that is in the geographic vicinity of the person receiving the page. In addition, the paging device as described herein is lightweight, portable and has a relatively long operating life before requiring new batteries and/or recharge.

Figure 3:
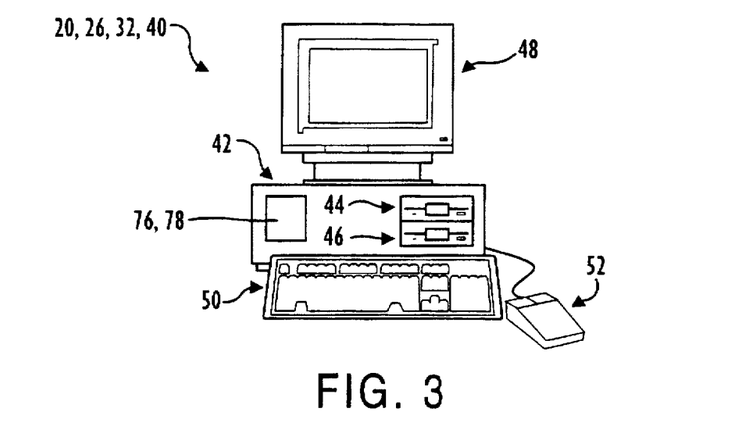
FIG. 3 is an illustration of a computer of a type suitable for implementing the processes for connecting a person initiating the page request with a person receiving the page in conjunction with the paging device.

FIG. 3 illustrates a computer of a type suitable for carrying out the invention. Viewed externally in FIG. 3, a computer system designated by reference numerals 20, 26, 32 and/or 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the paging device to further enhance the portability of the paging device described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well.

In addition, the computer system also includes at least one infrared transmitter 76 and/or infrared receiver 78 for either transmitting and/or receiving infrared signals which contain the identification signal, i.e., the signal which transmitted from the person that is to receive the page request to the paging service identifying the destination telephone via the destination telephone number that is geographically in the vicinity of the person that has already received the page request.

Figure 4A:
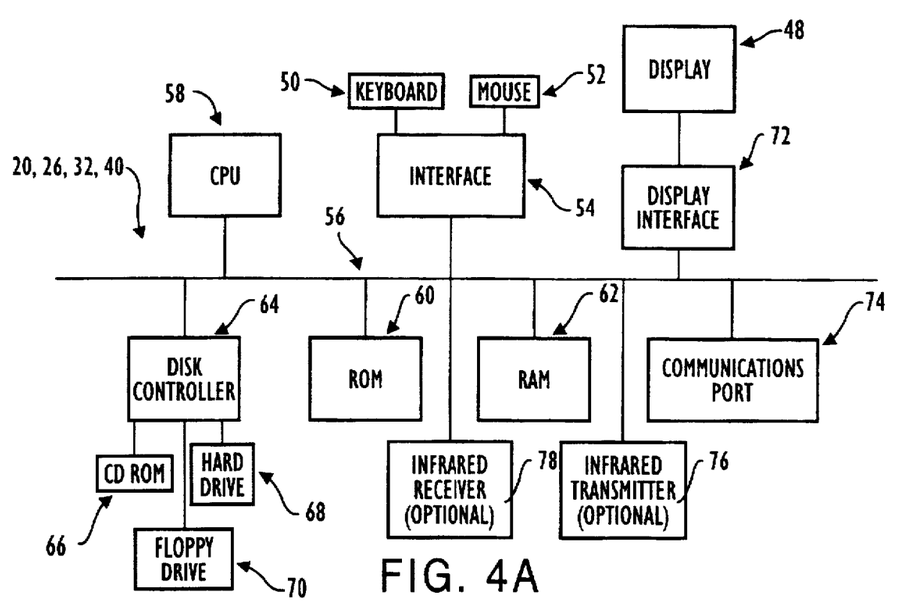
FIG. 4A is a diagram of the internal hardware of FIG. 3 in accordance with a first embodiment.

FIG. 4A illustrates a block diagram of the internal hardware of the computer of FIG. 3. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted from the paging device, and a display on the telephone may be used to display the information that is to be received by the person receiving the page. Communication with external devices occurs utilizing communication port 74.

In addition to the standard components of the computer, the computer also includes at least one of infrared transmitter 76 or infrared receiver 78. Infrared transmitter 76 is utilized when the computer system is used in conjunction with the paging device. Infrared receiver 78 is generally utilized when the computer system is used in conjunction with the telephone that is to receive the infrared signal and which transmits the identification signal to the paging service.

Figure 4B:
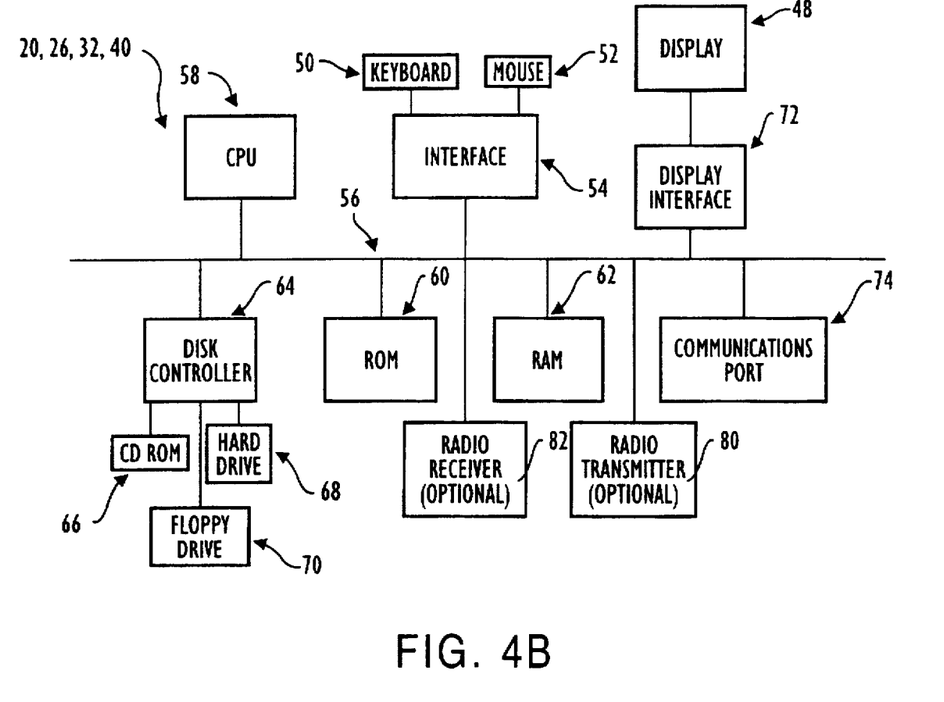
FIG. 4B is a block diagram of the internal hardware of the computer of FIG. 3 in accordance with a second embodiment.

FIG. 4B is a block diagram of the internal hardware of the computer of FIG. 3 in accordance with a second embodiment. In FIG. 4B, instead of utilizing an infrared transmitter or infrared receiver, the computer system uses at least one of a low power radio transmitter 80 and/or a low power radio receiver 82. The low power radio transmitter 80 transmits the identification signal for reception by the low power radio receiver 82. Once the low power radio receiver 82 receives the identification signal, the low power radio receiver 82 transmits the identification signal including the destination telephone number to the paging service for telephonically connecting the person initiating the page request with the person that has already received the page request.

Figure 4C:
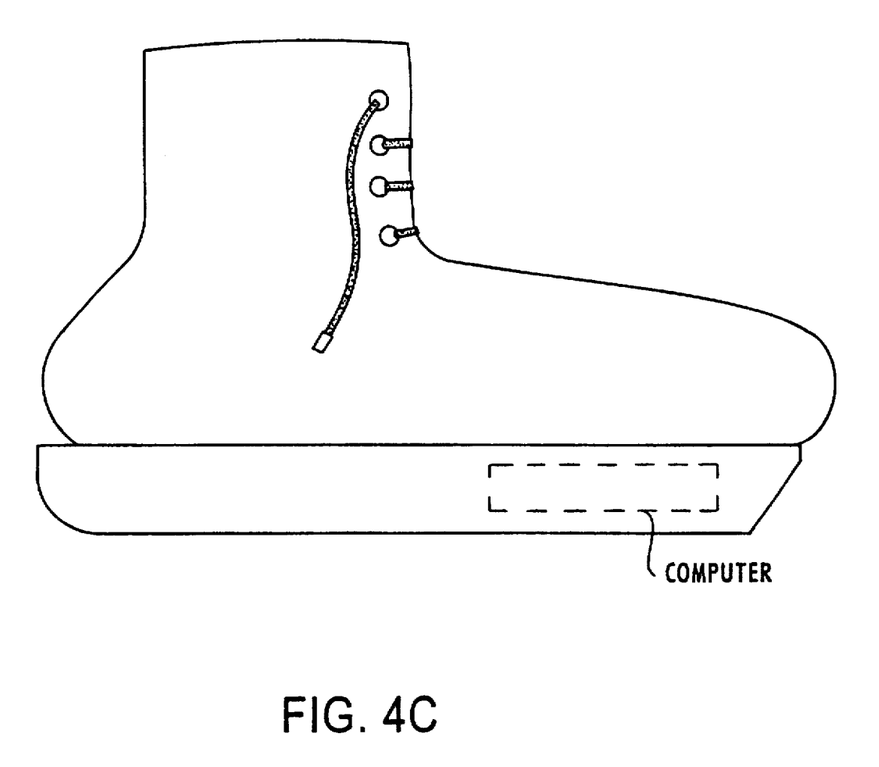
FIG. 4C is an illustration of an exemplary shoe computer useful in carrying out the invention.

The low power radio transmitter and/or receiver 80, 82 are standard devices in industry. One particularly interesting radio transmitter/receiver is what has been termed the "shoe computer" that has been developed at Massachusetts Institute of Technology's (MIT) Engineering Department. As shown in FIG. 4C, the shoe computer is built into the sole of, for example, a sneaker, and uses power generated by the foot repeatedly pushing down as the person wearing the shoe computer walks. The shoe computer also has the ability to transmit to other people's shoe computers when one person wearing a shoe computer touches or shakes hands with another person that also has the shoe computer. Thus in this design, a second shoe computer would be attached to the telephone. Once the person wearing the shoe computer touches the telephone, the shoe computer that is being worn by the person that has received the page request will identify itself to the second shoe computer associated with the telephone. The shoe computer which is associated with the telephone will then transmit the identification signal to the paging service via, for example, central office switch 4.

Figure 5:
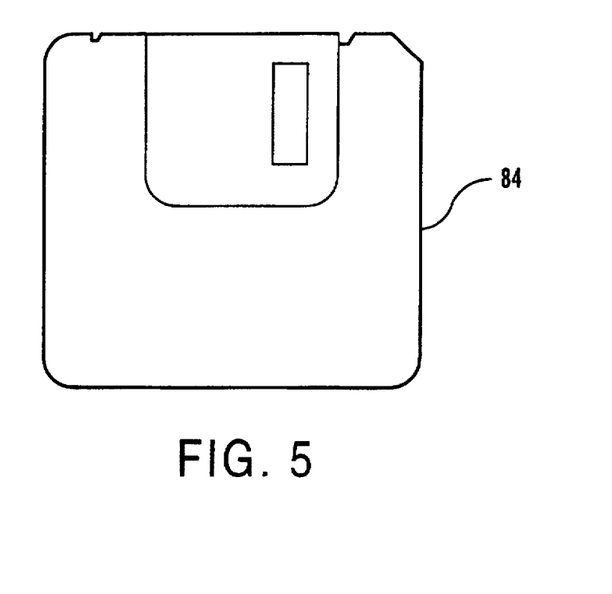
FIG. 5 is an illustration of an exemplary memory medium which can be used with the computer illustrated in FIGS. 3, 4A and 4B.

FIG. 5 is an illustration of an exemplary memory medium which can be used with disk drives illustrated in FIGS. 3, 4A and 4B. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 4A and 4B can also be used to store the program information that is used to instruct the central processing unit 58 to perform the operations associated with the paging device.

Figure 6:
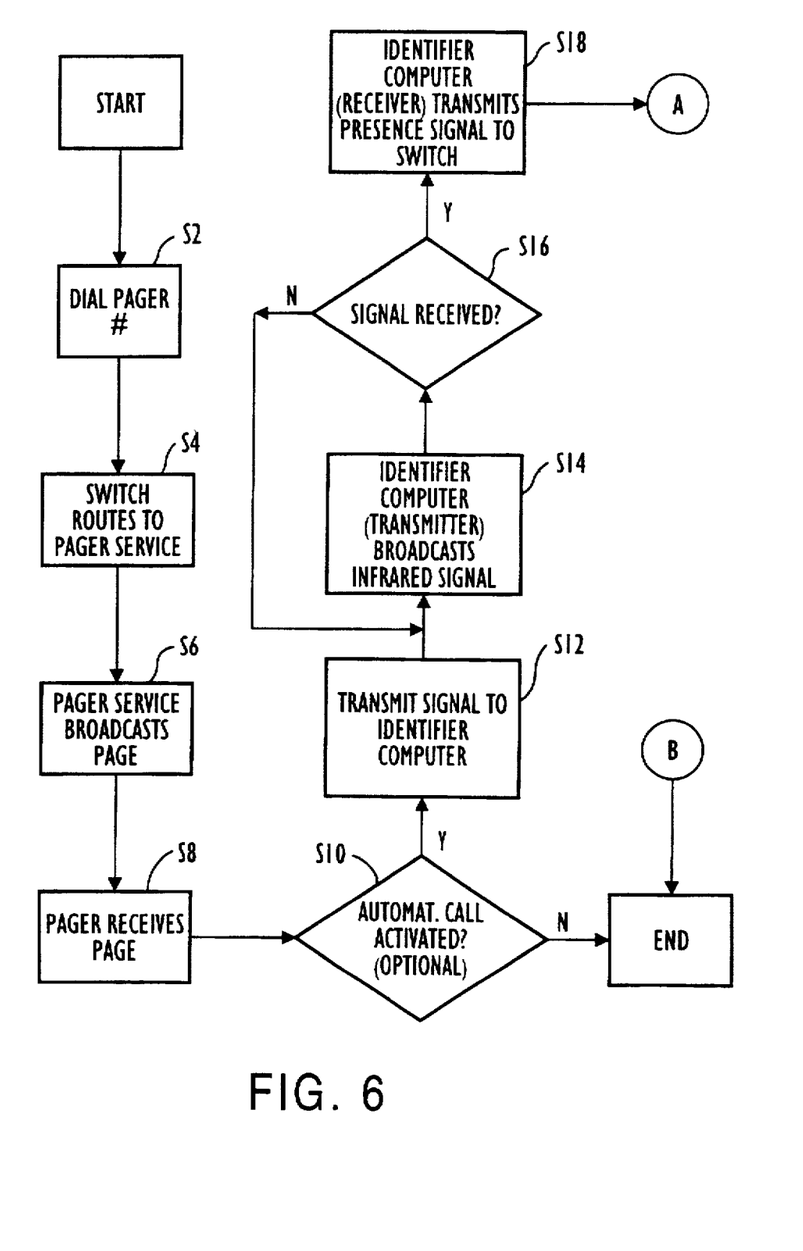
FIGS. 6–7 are flow charts describing the overall computer operations/processes performed to telephonically connect the person initiating the page request with the person receiving the page in accordance with a first process design.
Figure 7:
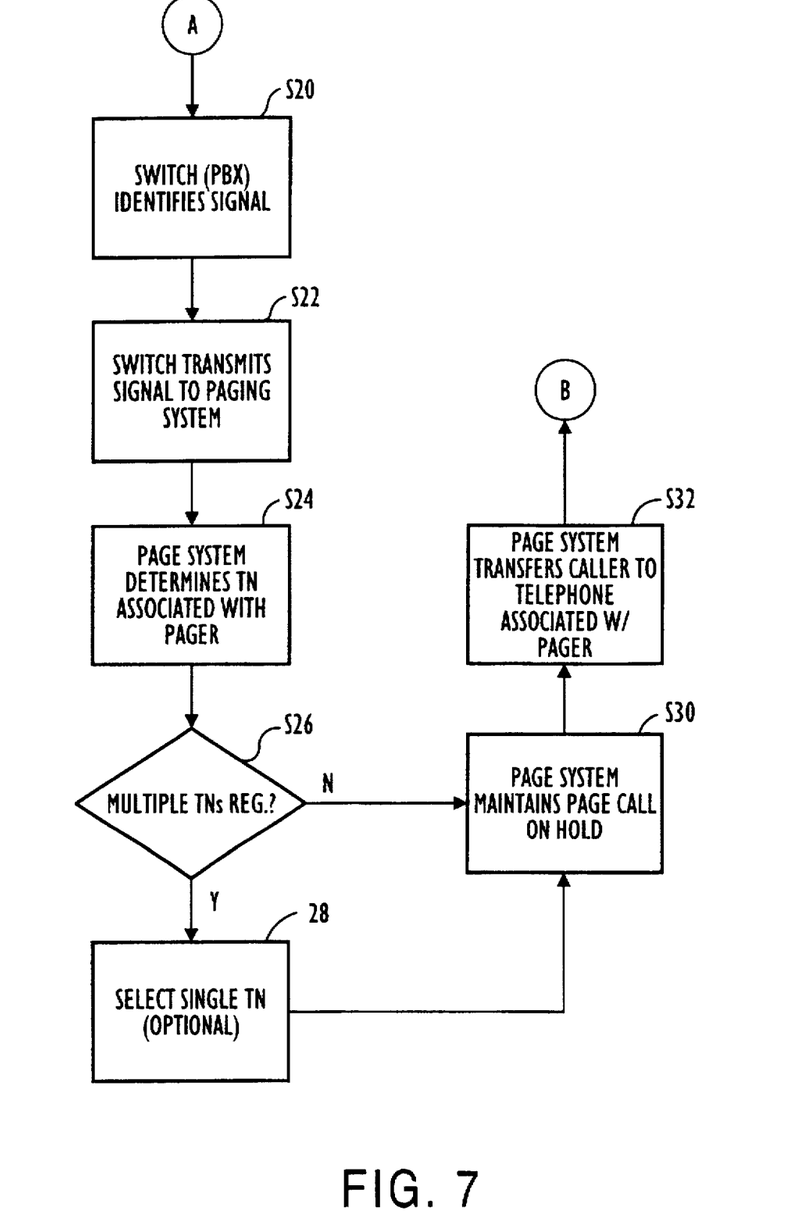

FIGS. 6–7 are flow charts illustrating the computer implemented functions performed by the paging device in accordance with a first program design. In FIGS. 6–7, telephone 2 associated with the person initiating the page request is used to dial the pager number in Step S2, and the switch 4 routes the telephone call to the pager service in Step S4. Upon receipt of the page request from the person initiating it, the paging service then broadcasts the page request via page transmitter/receiver 8 in Step S6. The paging service optionally broadcasts the page for a predetermined period of time until receipt of an acknowledgement from the paging device.

If the predetermined period of time elapses before the paging service receives acknowledgement from the paging device, the paging service has the option of disconnecting the person initiating the page request and contacting that person at a later time when acknowledgement has been received from the paging device. This technique of automatically calling back the page initiator upon receipt of the acknowledgement from the paging device is a standard technique well known to those in the telecommunications field.

Upon receipt of the page request by the paging device from the paging service in Step S8, the paging device optionally determines whether the user or person receiving the page request has indicated that calls are to be automatically routed upon acknowledgement of the page request by the paging device in Step S10 (i.e., an on/off switch on the paging device). If the user has decided not to utilize the automatic connection feature with the page initiator in Step S10, then the process ends and the paging device does not automatically telephonically connect the page initiator with the page receiver.

If the user has activated the automatic call connection in Step S10, then the pager 12 transmits a signal to identifier computer 20 indicating that the page request has been received. Upon receipt of the signal transmitted by pager 12, identifier computer 20 then broadcasts an infrared signal via infrared transmitter 22 indicating that the person that has just received the page request is prepared to be connected telephonically with the person initiating the page request in Step S14. Identifier computer 20 continuously transmits the infrared signal via transmitter 22 in Step S16 until the identifier signal has been received by, for example, identifier computer 28 via infrared receiver 26.

Identifier computer 28 then transmits a signal to central office switch 4 indicating that the user is now in the geographic vicinity of a telephone as well as the specific telephone number associated with that nearby telephone in Step S18. Switch 4 (optionally a private branch exchange) (PBX) identifies the incoming signal from identifier computer 28 in Step S20, and transmits a signal to the page locator computer 40 in the paging system either directly or via page transmitter/receiver 8 in Step S22. Page locator computer 40 then determines the telephone number associated with the pager by analyzing the received signal containing same, and is optionally determines whether multiple telephone numbers are included in the received signal in Step S26. The multiple received telephone numbers indicated that the person that is to receive the page request is in the location of multiple telephones that are eligible to receive the direct telephone call with the page initiator.

If multiple telephone numbers are included in the signal received from the paging device, then page locator computer 40 selects one of the telephone numbers in Step 28 while the page locator computer maintains the call with the page initiator on hold in Step S30. In fact, unless the page locator computer 40 has determined that it has not received the response from the paging device within the predetermined period of time (an optional feature), the page locator computer will maintain the person initiating the page request on hold until receipt of the signal indicating that the person that has received the page request is ready for receiving the telephone call with the page initiator.

If only a single destination number is included in the signal or if the page locator computer 40 has selected a single telephone or destination number from multiple received telephone numbers, then in Step S32, the page locator computer 40 transfers the person initiating the page request to the telephone that is associated with and geographically near the paging device, i.e., that is geographically near the person that has received the page request and then has to be telephonically connected to the person initiating the page. The paging device then turns to its previous operation of monitoring for the next incoming page request.

Figure 8:
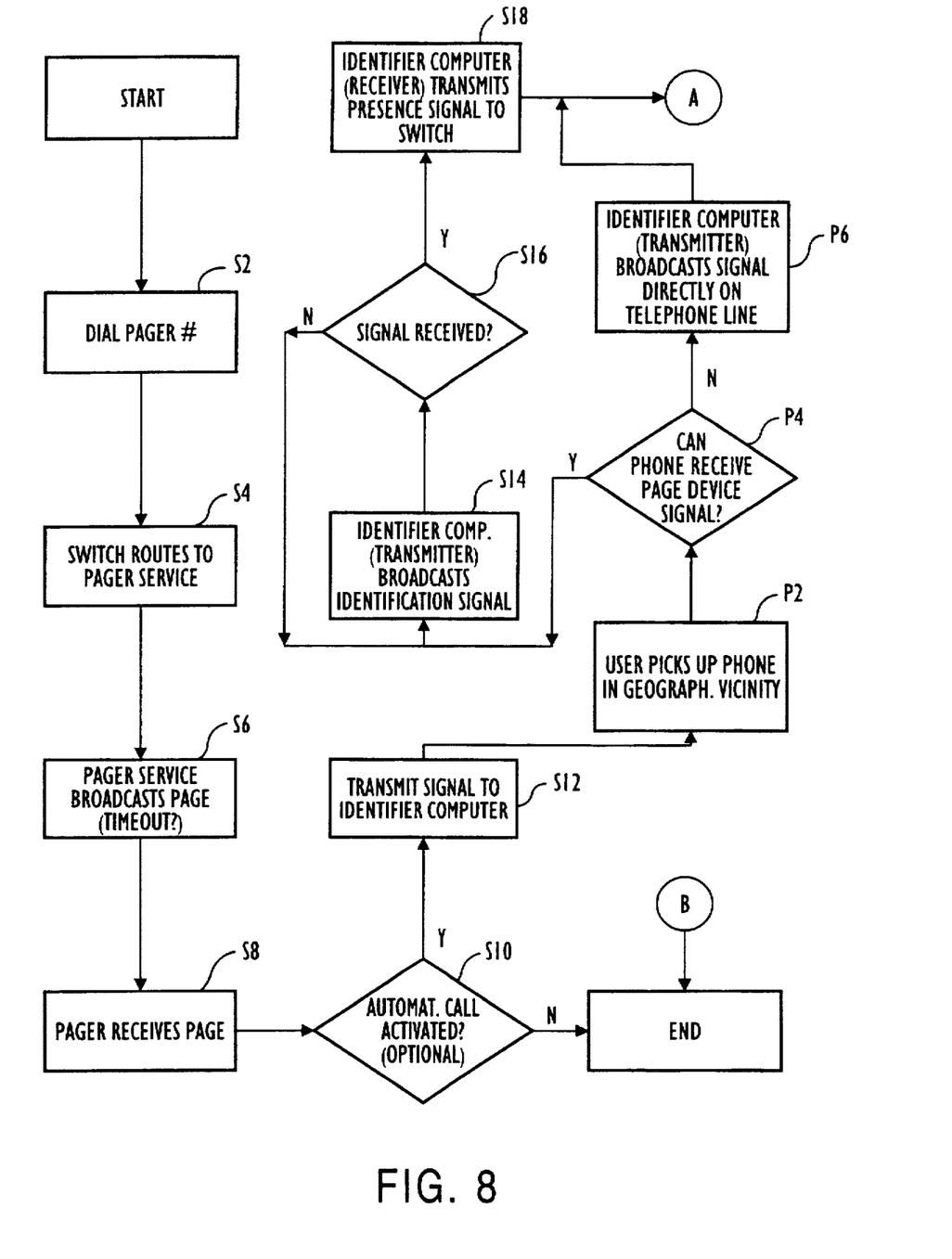
FIG. 8 is a flow chart illustrating the computer implemented processes or operations used to telephonically connect the person initiating the page request with the person receiving the page in accordance with a second process design.

FIG. 8 is a flow chart of the computer implemented process of the paging device in accordance with a second process design. This second process design, however, utilizes the additional process as described in connection with the flow chart in FIG. 7 and as designated by the letter "A" in a circle. In FIG. 8, only the differences between the second process design and the first process design are described. Accordingly, in FIG. 8, when the pager 12 receives the page request and transmits the signal to identifier computer 20 in Step S12, the user or person that has received the page request will then pick up the telephone in the near geographic vicinity in Step P2. Upon picking up the telephone (or placing it off hook), the identifier computer 20 determines whether the telephone that has been placed off hook can receive the page device signal in Step P4. For example, the identifier computer 20 can transmit an infrared signal via transmitter 22 and if it does not receive an acknowledgement within a predetermined period of time, can conclude that the telephone in the vicinity of the person that has received the page request cannot receive the page identification signal.

If the identifier computer 20 determines that the telephone can receive the page signal, then the identifier computer 20 broadcasts an identification signal in Step S14 until it has determined that the identification signal has been received by the identifier computer 28 in Step S16. After identification computer 28 has received the signal, identifier computer 28 transmits the signal to switch 4 in Step S18. On the other hand, if the identification computer 20 determines that the telephone cannot receive the signal, the identifier computer 20 will broadcast the signal directly on the telephone line in Step P6 instead of utilizing the identifier computer 28 for this function. The remaining processes for this embodiment are then disclosed in FIG. 7.

Accordingly, the paging device enables the person initiating the page request to be telephonically connected with the person that has received the page request in an expedited manner. The paging device also has the ability to determine when the person that has received the page request is available and/or ready to be telephonically connected with the page initiator. The paging device also has the ability to disconnect the person initiating the page request in the event that the person that is to receive the page request has not responded within a predetermined period of time. The paging device advantageously can then recontact the person initiating the page request at a later time when the person that is to receive the page request acknowledges receipt of same. The page device further includes the ability to submit a calling card or credit card number to pay for a toll or chargeable telephone call. Other designs are of course considered within the scope of this paging device. For example, various different types of standard hardware could be used for the processing functions utilized in the paging device in conjunction with the pager.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A paging system for communicatively connecting a first user initiating a page request using a first telephone to a second user, comprising:

a page transmitter transmitting the page request;

a paging device responsively connected to said page transmitter, said paging device comprising:

11 a page receiver receiving the page request as a first signal;

a first identification device responsively connected to said page receiver, receiving the first signal and generating a page received signal; and an identification transmitter for transmitting a second signal responsive to said page received signal indicating that the second user is ready to connect to the first user;

a second identification device associated with a second telephones, receiving the second signal and transmitting a third signal including a destination number corresponding to the second telephone; and a locator computer receiving the third signal transmitted by said second identification device, said locator computer connecting the first telephone to the second telephone responsive to the destination number received in the third signal.

2. A paging system according to claim 1, wherein the destination number is a telephone number.

3. A paging system according to claim 1, wherein the second signal is an infrared signal.

4. A paging system according to claim 1, wherein the second signal is a low power radio signal.

5. A paging system for communicatively connecting a first user initiating a page request using a first telephone to a second user, comprising:

a page transmitter transmitting the page request;

a paging device responsively connected to said page transmitter, said paging device comprising:

a page receiver receiving the page request as a first signal;

a first identification device responsively connected to said page receiver, receiving the first signal and generating a page received signal; and an identification transmitter for transmitting a second signal responsive to said page received signal indicating that the second user is ready to connect to the first user;

a second identification device associated with a second telephone, receiving the second signal and transmitting a third signal including a destination number corresponding to the second telephone; and a locator computer receiving the third signal transmitted by said second identification device, said locator computer connecting the first telephone to the second telephone responsive to the destination number received in the third signal, wherein at least one of said first and second identification devices is a shoe computer.

6. A paging system according to claim 1, wherein said locator computer maintains the first user using the first telephone initiating the page request on hold until receiving the third signal from said second identification device.

7. A paging system according to claim 1, wherein said locator computer determines a telephone number for connecting the first user to the second user responsive to the destination number.

8. A paging system according to claim 1, wherein when said second identification device does not transmit the third signal after a predetermined period of time, said locator computer disconnects communication with the first user, and wherein when said second identification device transmits the third signal after the predetermined period of time, said locator computer re-establishes communication with the first user and communicatively connects the first user initiating

12 the page request using the first telephone to the second user receiving the page request using the second telephone.

9. A paging system according to claim 1, wherein when the connection between the first user and the second user comprises a toll call, said first identification device transmits at least one of a credit card number or a calling card number in payment for the connection.

10. A method for communicatively connecting a first user initiating a page request using a first telephone to a second user receiving the page request at a second telephone, said method comprising the steps of:

(a) transmitting the page request as a first signal;

(b) receiving the first signal at a location of the second user;

(c) transmitting a second signal indicating that the second user is ready to be connected to the first user;

(d) in response to said second signal, transmitting a third signal including a destination number corresponding to the second telephone; and (e) communicatively connecting the first user to the second user responsive to the destination number received in the third signal.

11. A method according to claim 10, wherein the destination number is a telephone number.

12. A method according to claim 10, wherein the second signal is an infrared signal.

13. A method according to claim 10, wherein the second signal is a low power radio signal.

14. A method according to claim 10, further comprising the step of placing on hold the first user using the first telephone initiating the page request until the third signal is received.

15. A method according to claim 10, further comprising the step of determining a telephone number for connecting the first user using the first telephone initiating the page request to the second user responsive to the destination number.

16. A method according to claim 10, wherein when the third signal is not transmitted after a predetermined period of time, disconnecting communication with the first user, and when said the third signal is transmitted after the predetermined period of time, re-establishing communication with the first user and connecting the first user to the second user at the second telephone.

17. A method according to claim 10, wherein when the connection between the first user and the second user comprises a toll call, said first identification device transmits at least one of a credit card number or a calling card number in payment for the connection.

18. A paging system for communicatively connecting a first user initiating a page request using a first telephone to a second user receiving the page request using a second telephone, comprising:

a page transmitter transmitting the page request;

a paging device responsively connected to said page transmitter, said paging device comprising a page receiver receiving the page request as a first signal;

a first identification device responsively connected to said page receiver, said first identification device receiving the first signal indicating that the page request was received by said page receiver, said first identification device including an identification transmitter for transmitting a second signal indicating that the second user is ready to be communicatively connected to the first user initiating the page request;

a second identification device associated with the second telephone and receiving the second signal transmitted by said first identification device, said second identification device transmitting a third signal including a destination number corresponding and addressable to the second telephone; and a page locator device receiving notification of the page request from the first user and receiving the third signal transmitted by said second identification device, said page locator device communicatively connecting the first user initiating the page request using the first telephone to the second user receiving the page request using the second telephone responsive to the destination number received in the third signal.

19. In a paging system for communicatively connecting a first user initiating a page request using a first telephone to a second user receiving the page request using a second telephone, the paging system includes a page transmitter transmitting the page request, a paging device comprising a page receiver receiving the page request as a first signal;

a first identification device responsively connected to said page receiver, said first identification device receiving the first signal indicating that the page request was received by said page receiver, transmitting a second signal indicating that the second user is ready to be communicatively connected to the first user initiating the page request a second identification device associated with the second telephone and receiving the second signal transmitted by said first identification device, said second identification device transmitting a third signal including a destination number corresponding and addressable to the second telephone; and a page locator device receiving notification of the page request from the first user and receiving the third signal transmitted by said second identification device, said page locator device communicatively connecting the first user initiating the page request using the first telephone to the second user receiving the page request using the second telephone responsive to the destination number received in the third signal.

20. A paging device according to claim 19, wherein the second signal transmitted by said first identification device comprises an infrared signal, and wherein the second telephone includes said second identification device and an infrared receiver, and wherein the infrared receiver receives the infrared signal transmitted from said first identification device.

21. A paging device according to claim 19, wherein the paging device is portable.

22. A paging system for connecting a first user initiating a page request sent during a telephone call using a first telephone to a second user at a location of a second telephone, comprising:

a central office switching center receiving the telephone call and the page request from the first user;

a page transmitter station receiving the telephone call from said central office switching center, and transmitting the page request in response thereto;

a paging device comprising a page receiver receiving the page request as a first signal;

a first identification device responsively connected to said page receiver, said first identification device receiving the first signal indicating that the page request was received by said page receiver, said first identification device including an identification transmitter for transmitting a second signal indicating that the second user is ready to be connected to the first user;

a second identification device associated with the second telephone and receiving the second signal and transmitting a third signal including a destination number corresponding to the second telephone; and a page locator device responsive to notification of the page request from the first user and to the third signal transmitted by said second identification device, connecting the first user to the second user at the second telephone responsive to the destination number received in the third signal via said central office switching center.

23. A computer program product comprising:

a memory medium; and a computer program stored on said memory medium, said computer program including instructions for receiving a page request; and transmitting a second signal indicating that a user is ready to be connected to a user initiating the page request.

* * * * *

UNITED STATES PATENT AND TRADEMARK OFFICE
CERTIFICATE OF CORRECTION

PATENT NO. : 5,790,949
DATED : August 4, 1998
INVENTOR(S) : Bruce TOGNAZZINI

It is certified that error appears in the above-indentified patent and that said Letters Patent is hereby corrected as shown below:

In the Claims, Column 11, Line 11, change "telephones" to --telephone--; Column 13, Line 28, after "request" insert --;--.

Signed and Sealed this

Twenty-sixth Day of January, 1999

Attest:

Attesting Officer

*Acting Commissioner of Patents and Trademarks*